United States Patent
Li et al.

(10) Patent No.: US 10,387,515 B2
(45) Date of Patent: Aug. 20, 2019

(54) NETWORK SEARCH QUERY

(71) Applicant: INTERNATIONAL BUSINESS MACHINES CORPORATION, Armonk, NY (US)

(72) Inventors: Ying Li, Mohegan Lake, NY (US); Anh Q. Lu, Austin, TX (US); Jian Lu, Ningbo (CN); Chuan Y. Wang, Ningbo (CN); Wei Yan, Ningbo (CN); Shen H. Zhan, Ningbo (CN); Xin Y. Zhou, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 15/617,457

(22) Filed: Jun. 8, 2017

(65) Prior Publication Data

US 2018/0357320 A1    Dec. 13, 2018

(51) Int. Cl.
| | |
|---|---|
| *G06F 16/242* | (2019.01) |
| *G06F 16/248* | (2019.01) |
| *G06F 16/2457* | (2019.01) |
| *G06F 16/9535* | (2019.01) |

(52) U.S. Cl.
CPC ........ *G06F 16/9535* (2019.01); *G06F 16/248* (2019.01); *G06F 16/2425* (2019.01); *G06F 16/24578* (2019.01)

(58) Field of Classification Search
CPC .......... G06F 16/9535; G06F 16/24578; G06F 16/2425; G06F 16/248; G06F 17/30867; G06F 17/30395; G06F 17/3053; G06F 17/30554
See application file for complete search history.

(56) References Cited

U.S. PATENT DOCUMENTS

| | | | |
|---|---|---|---|
| 5,987,457 A * | 11/1999 | Ballard | G06F 17/30867 |
| 6,766,320 B1 | 7/2004 | Wang et al. | |
| 7,340,460 B1 * | 3/2008 | Kapur | G06F 16/955 |
| 8,510,298 B2 | 8/2013 | Khandelwal | |
| 9,098,600 B2 | 8/2015 | Chetuparambil et al. | |
| 2003/0217052 A1 * | 11/2003 | Rubenczyk | G06F 16/3323 |
| 2004/0093321 A1 * | 5/2004 | Roustant | G06F 17/30867 |
| 2005/0154713 A1 * | 7/2005 | Glover | G06F 17/30964 |
| 2005/0203878 A1 * | 9/2005 | Brill | G06F 17/3064 |
| 2005/0273369 A1 | 12/2005 | Ota et al. | |

(Continued)

*Primary Examiner* — James E Richardson
(74) *Attorney, Agent, or Firm* — Schmeiser, Olsen & Watts; Mark C. Vallone (57) ABSTRACT

A method and system for improving a network search query is provided. The method includes executing a real time search with respect to a database associated with an Internet based search for specified digital information. Digital attributes of digital data identified during the real time search are identified and keywords associated with the digital attributes are ranked. In response, search based software code associated with an Internet search for the digital information is generated and associated real time user interactions are recorded. The search based software code is modified resulting in generation of modified search based software code. The modified search based software code is executed and relevant results associated with the Internet based search are presented via a GUI. The database is configured such that the modified search is stored within a logical partition of the database.

11 Claims, 7 Drawing Sheets

(56) References Cited

U.S. PATENT DOCUMENTS

| | | | |
|---|---|---|---|
| 2006/0047701 A1* | 3/2006 | Maybury | G06F 17/30828 |
| 2006/0106793 A1* | 5/2006 | Liang | G06F 17/30654 |
| 2006/0167842 A1* | 7/2006 | Watson | G06F 17/3064 |
| 2006/0242130 A1* | 10/2006 | Sadri | G06F 17/30864 |
| 2007/0124263 A1* | 5/2007 | Katariya | G06F 17/30663 |
| | | | 706/14 |
| 2007/0282892 A1 | 12/2007 | Probst et al. | |
| 2008/0059281 A1 | 3/2008 | Tower et al. | |
| 2010/0211588 A1* | 8/2010 | Jiang | G06F 16/90324 |
| | | | 707/768 |
| 2011/0307504 A1 | 12/2011 | Agrawal et al. | |
| 2012/0041849 A1 | 2/2012 | Blumenthal et al. | |
| 2015/0254247 A1* | 9/2015 | Bostick | G06F 17/30684 |
| | | | 707/724 |
| 2016/0063115 A1* | 3/2016 | Ayan | G06Q 50/01 |
| | | | 707/722 |
| 2018/0189403 A1* | 7/2018 | Altaf | G06F 17/30867 |
| 2018/0357320 A1* | 12/2018 | Li | G06F 17/30867 |

\* cited by examiner

NETWORK SEARCH QUERY

FIELD

The present invention relates generally to a method for executing a network search query and in particular to a method and associated system for improving a real time search for digital information resulting in generation of modified search based software code for configuring a database structure.

BACKGROUND

Accurately locating information typically includes an inaccurate process with little flexibility. Generating systems and software for locating information may include a complicated process that may be time consuming and require a large amount of resources. Accordingly, there exists a need in the art to overcome at least some of the deficiencies and limitations described herein above.

SUMMARY

A first aspect of the invention provides a network search query improvement method comprising: executing, by a processor of a hardware device, a real time search with respect to a specialized database associated with an Internet based search for specified digital information; automatically identifying, by the processor, digital attributes of associated digital data identified during the real time search; ranking, by the processor, specified keywords associated with the digital attributes; generating, by the processor based on results of the ranking, search based software code associated with an Internet search for the specified digital information; recording, by the processor, real time user interactions with the search based software code; modifying, by the processor based on the real time user interactions, the search based software code resulting in generation of modified search based software code; executing, by the processor in response to a user command, the modified search with respect to the digital attributes based on the modified search based software code; presenting, by the processor via a specialized graphical user interface, relevant results associated with the Internet based search for the specified digital information; and configuring, by the processor based on the relevant results, the database such that the modified search is stored within a logical partition of the database, wherein the logical partition is enabled to execute multiple real time Internet searches for the specified digital information.

A second aspect of the invention provides a computer program product, comprising a computer readable hardware storage device storing a computer readable program code, the computer readable program code comprising an algorithm that when executed by a processor of a hardware device implements a network search query improvement method, the method comprising: executing, by the processor, a real time search with respect to a specialized database associated with an Internet based search for specified digital information; automatically identifying, by the processor, digital attributes of associated digital data identified during the real time search; ranking, by the processor, specified keywords associated with the digital attributes; generating, by the processor based on results of the ranking, search based software code associated with an Internet search for the specified digital information; recording, by the processor, real time user interactions with the search based software code; modifying, by the processor based on the real time user interactions, the search based software code resulting in generation of modified search based software code; executing, by the processor in response to a user command, the modified search with respect to the digital attributes based on the modified search based software code; presenting, by the processor via a specialized graphical user interface, relevant results associated with the Internet based search for the specified digital information; and configuring, by the processor based on the relevant results, the database such that the modified search is stored within a logical partition of the database, wherein the logical partition is enabled to execute multiple real time Internet searches for the specified digital information.

A third aspect of the invention provides a hardware device comprising a processor coupled to a computer-readable memory unit, the memory unit comprising instructions that when executed by the computer processor implements a network search query improvement method comprising: executing, by the processor, a real time search with respect to a specialized database associated with an Internet based search for specified digital information; automatically identifying, by the processor, digital attributes of associated digital data identified during the real time search; ranking, by the processor, specified keywords associated with the digital attributes; generating, by the processor based on results of the ranking, search based software code associated with an Internet search for the specified digital information; recording, by the processor, real time user interactions with the search based software code; modifying, by the processor based on the real time user interactions, the search based software code resulting in generation of modified search based software code; executing, by the processor in response to a user command, the modified search with respect to the digital attributes based on the modified search based software code; presenting, by the processor via a specialized graphical user interface, relevant results associated with the Internet based search for the specified digital information; and configuring, by the processor based on the relevant results, the database such that the modified search is stored within a logical partition of the database, wherein the logical partition is enabled to execute multiple real time Internet searches for the specified digital information.

The present invention advantageously provides a simple method and associated system capable of accurately locating information.

DETAILED DESCRIPTION

Figure 1:
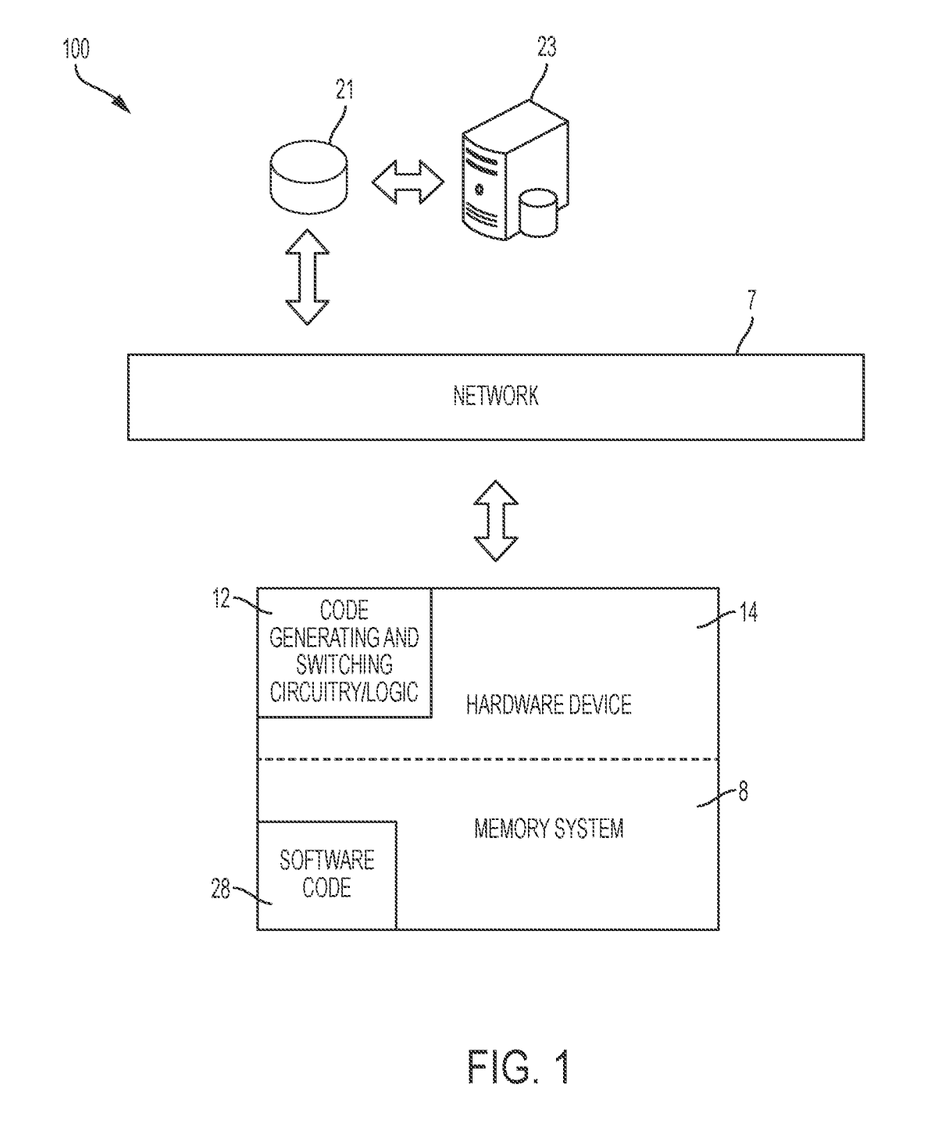
FIG. 1 illustrates a system for improving a real time search for digital information resulting in generation of modified search based software code for configuring a database structure, in accordance with embodiments of the present invention.

FIG. 1 illustrates a system 100 for improving a real time search for digital information resulting in generation of modified search based software code for configuring a database structure, in accordance with embodiments of the present invention. System 100 is enabled to identify and rank key attributes and parameters associated with an Internet search for items (category) to automatically design search based software code for enabling a natural language interaction system. System 100 enables a process for improving real time search for digital information by:
1. Retrieving item attribute data and system software and hardware log data.
2. Applying information entropy code with respect to metrics for measuring an importance of an item attribute.
3. Analyzing a user query log to identify attributes missing from the attribute data and processes.

System 100 enables a process for improving a real time search for digital information by:
1. Executing a real time search for digital information.
2. Generating and modifying search based software code.
3. Configuring logical partitions of a database for execution multiple real time Internet searches.

System 100 of FIG. 1 includes a database server 23 connected to a database system 21 connected through a network 7 to a hardware device 14. Hardware device 14 comprises code generation and switching circuitry/logic 12 and a memory system 8. Memory system 8 comprises generated software code 28. Server 23, database system 21, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-7. The specialized discrete non-generic analog, digital, and logic based circuitry (e.g., code generation circuitry/logic 15, etc.) may include proprietary specially designed components (e.g., a specialized integrated circuit, such as for example an Application Specific Integrated Circuit (ASIC) designed for only implementing an automated process for improving a real time search for digital information. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

Figure 2:
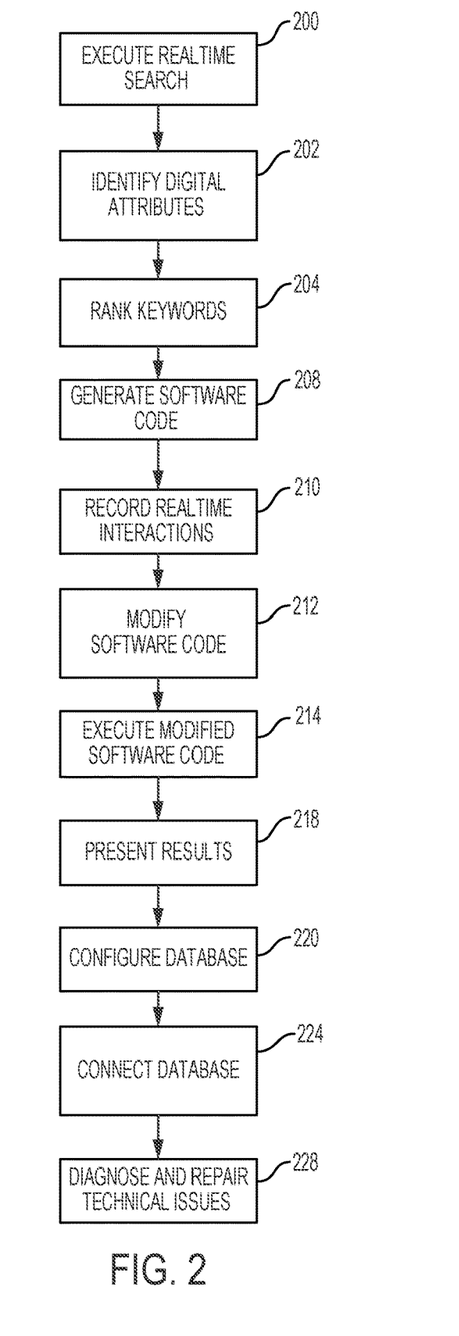
FIG. 2 illustrates an algorithm detailing a process flow enabled by the system of FIG. 1 for improving a real time search for digital information resulting in generation of modified search based software code for configuring a database structure, in accordance with embodiments of the present invention.

FIG. 2 illustrates an algorithm detailing a process flow enabled by system 100 of FIG. 1 for improving a real time search for digital information resulting in generation of modified search based software code for configuring a database structure, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by database server 23, database system 21, and/or hardware device 14 of FIG. 1. In step 200, a real time search with respect to a specialized database associated with an Internet based search for specified digital information is executed. In step 202, digital attributes of associated digital data identified during the real time search are automatically identified. The automatic identification process may include:
1. Replacing associated portions of the digital data with digital tokens representing the associated portions. A token is defined herein as a process for substituting a sensitive data element with a non-sensitive equivalent (i.e., a token) that comprises no extrinsic meaning or value. A token comprises a reference (i.e., an identifier) that maps back to sensitive data via a tokenization system. Mapping from original data to a token enables a process for rendering tokens infeasible to reverse without usage of the tokenization system.
2. Associating the digital tokens with the digital attributes.
3. Storing the digital tokens within an additional logical partition of the database.
4. Combining the digital tokens with the search based software code.

In step 204, specified keywords associated with the digital attributes are ranked. In step 208, search based software code associated with an Internet search for the specified digital information is generated based on the ranking of step 204. In step 210, real time user interactions with the search based software code are recorded. In step 212, the search based software code is modified (based on results of step 210) resulting in generation of modified search based software code. In step 214, the modified search based software code is executed. In step 218, relevant results associated with the Internet based search for the specified digital information are presented via a graphical user interface (GUI). In step 220, the database is configured such that the relevant results are stored within a logical partition of the database. The logical partition is enabled to execute multiple real time Internet searches for the specified digital information. In step 224, the database is automatically connected (via switching circuitry) to additional hardware devices for executing the multiple real time Internet searches for the specified digital information. In step 228, technical issues with the modified search based software code are automatically diagnosed and repaired.

Figure 3:
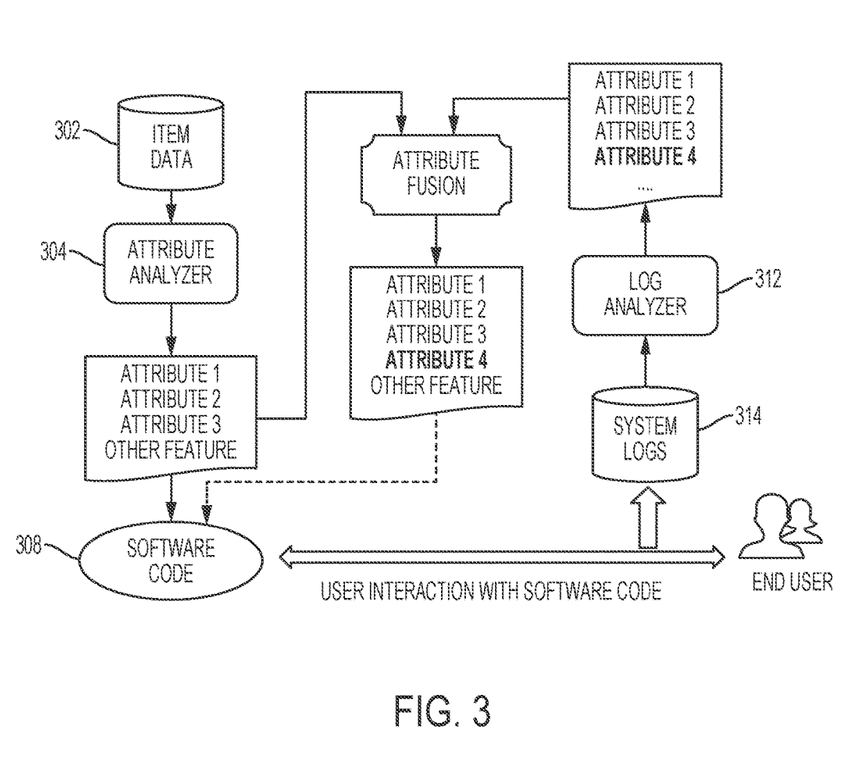
FIG. 3 illustrates execution of a step of FIG. 2 for identifying and ranking digital attributes, in accordance with embodiments of the present invention.

FIG. 3 illustrates execution of step 202 of FIG. 2 for identifying and ranking digital attributes, in accordance with embodiments of the present invention. The process illustrates an attribute analyzer 304 (i.e., software/hardware based) mining item data 302 and identifying key (digital) attributes and associated importance factors. The key attributes are ranked and used to generate search based software code 308 associated with item data 302. The search based software code 308 may comprise item non preexisting features for combination with item data 302. During user interaction with the search based software code 308, all user inputs are recorded and stored in a system log database 314. A log analyzer 312 (i.e., software/hardware based) reads data within system log database 314 and executed an analysis process for identifying any additional key attributes not retrieved up by the system (comprising the generated search based software code 308). The system refines the key attributes by fusing an output from both attribute analyzer 304 and log analyzer 312 for execution of the search based software code 308. The aforementioned process is repeated over time and the key attributes are updated continuously thereby automating the design of search based software code 308 for a natural language interaction system based on the mining of item attribute data and system log data. Search based software code 308 allows for the use information entropy to measure an importance of an item attribute. Additionally, search based software code 308 enables a process for analyzing a user query log to identify important attributes missing from the attribute data. Improve accuracy and efficiency of attribute definition for purchase dialog flows.

Attribute analyzer 304 identifies and ranks the key attributes for a given item category, using an information entropy measurement process. Entropy is defined herein as an expected value (average) of information contained in each message. Entropy may be defined as a sum of a discrete set of probabilities, where $p(x_i)$ comprises a probability of having a value $x_i$:

$$H(X) = -\sum_{i=1}^{n} p(x_i) \log p(x_i).$$

With respect to a case of transmitting messages, the larger the entropy, the more bits are required to code a message. Therefore, when an attribute comprises a large range of values, it will produce a large entropy. For example:

An item category may include a projector category including an office projector and a home projector with a total number of projectors=157. Associated attributes include: brightness, image size, resolution width, and resolution height. Therefore, it may be derived that brightness and image size are two key attributes for the item of projector. An importance ranking for the 4 attributes are: brightness>image size>resolution height>resolution width Log analyzer 312 analyzes (based on user input logs) user input to locate attributes not included in search based software code 308. A frequency for the attributes is recorded and if the frequency reaches a defined threshold, the attributes are added to search based software code 308. The user input logs may be retrieved from search based software code 308.

Figure 4:
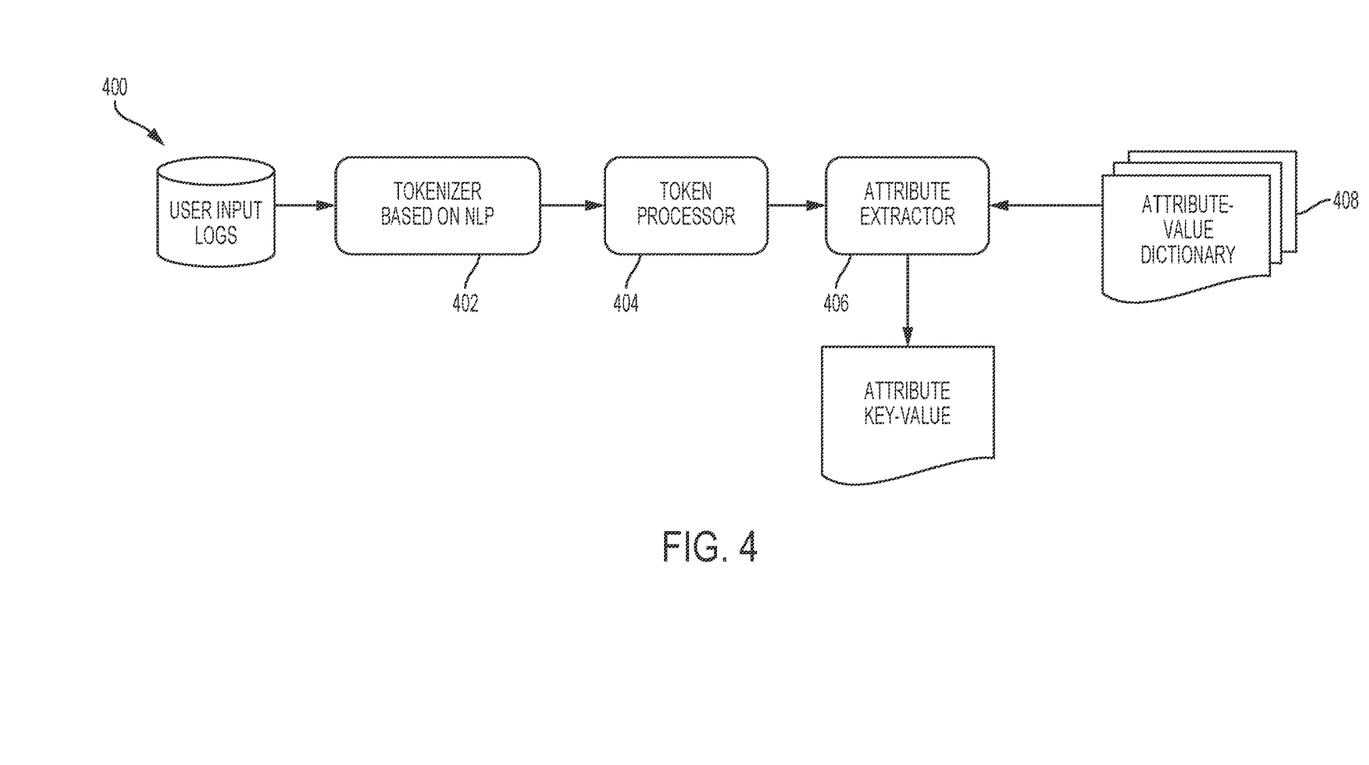
FIG. 4 illustrates a digital attribute extraction system, in accordance with embodiments of the present invention.

FIG. 4 illustrates a digital attribute extraction system 400, in accordance with embodiments of the present invention. Digital attribute extraction system 400 comprises a tokenizer 402 (hardware and software), a token processor 404 (hardware and software), an attribute extractor 406 (hardware and software), and an attribute value dictionary database 408. Tokenizer 402 is enabled to split an input sentence into words via execution of NLP technology. For example, a sentence "I want to buy a 500 GB USB 3.0 external hard drive" may be split into the following terms: "500 GB, USB, 3.0, external, hard, drive". Token processor 404 processes tokens based on defined patterns (e.g. a number+a unit). Additionally, token processor 404 removes words related to a current item type. For example, a sentence "500 GB, USB, 3.0, external, hard, drive" may be reduced to "500 GB", "USB 3.0". Attribute value dictionary database 408 stores attribute key/value pairs grouped by item type. Attribute extractor 406 uses tokenized words as attribute values and searches attribute value dictionary database 408 for a related attribute key.

Figure 5:
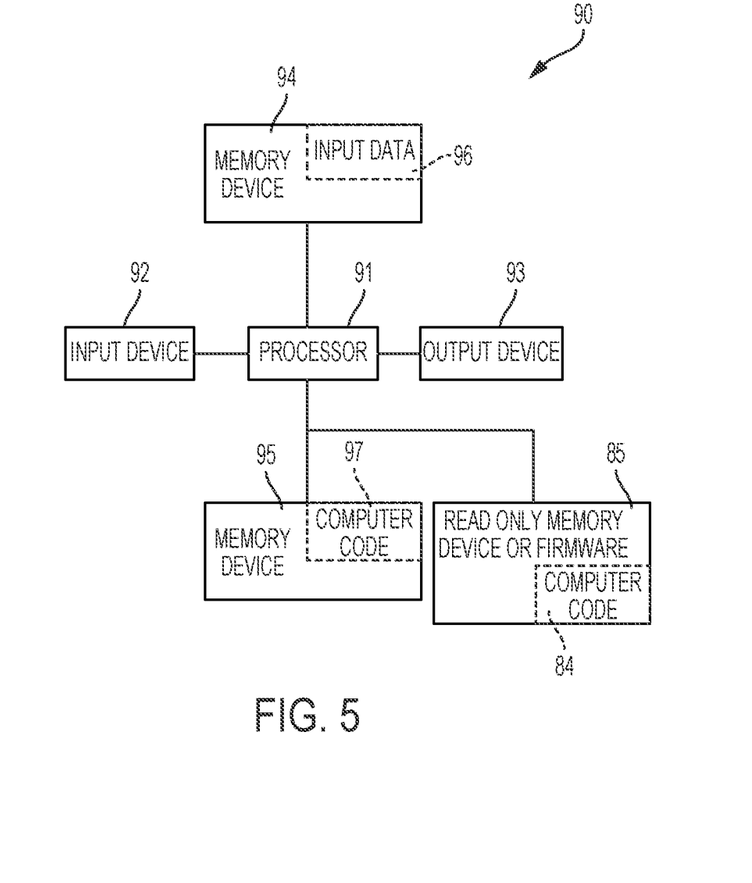
FIG. 5 illustrates a computer system used by the system of FIG. 1 for enabling a process for improving a real time search for digital information resulting in generation of modified search based software code for configuring a database structure, in accordance with embodiments of the present invention.

FIG. 5 illustrates a computer system 90 (e.g., database server 23, database system 21, and hardware device 14 of FIG. 1) used by or comprised by the system of FIG. 1 for improving a real time search for digital information resulting in generation of modified search based software code for configuring a database structure, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving a real time search for digital information resulting in generation of modified search based software code for configuring a database structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a real time search for digital information resulting in generation of modified search based software code for configuring a database structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving a real time search for digital information resulting in generation of modified search based software code for configuring a database structure. In another embodiment, the invention provides a business method that performs the process steps of the invention on a subscription, advertising, and/or fee basis. That is, a service supplier, such as a Solution Integrator, could offer to enable a process for improving a real time search for digital information resulting in generation of modified search based software code for configuring a database structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
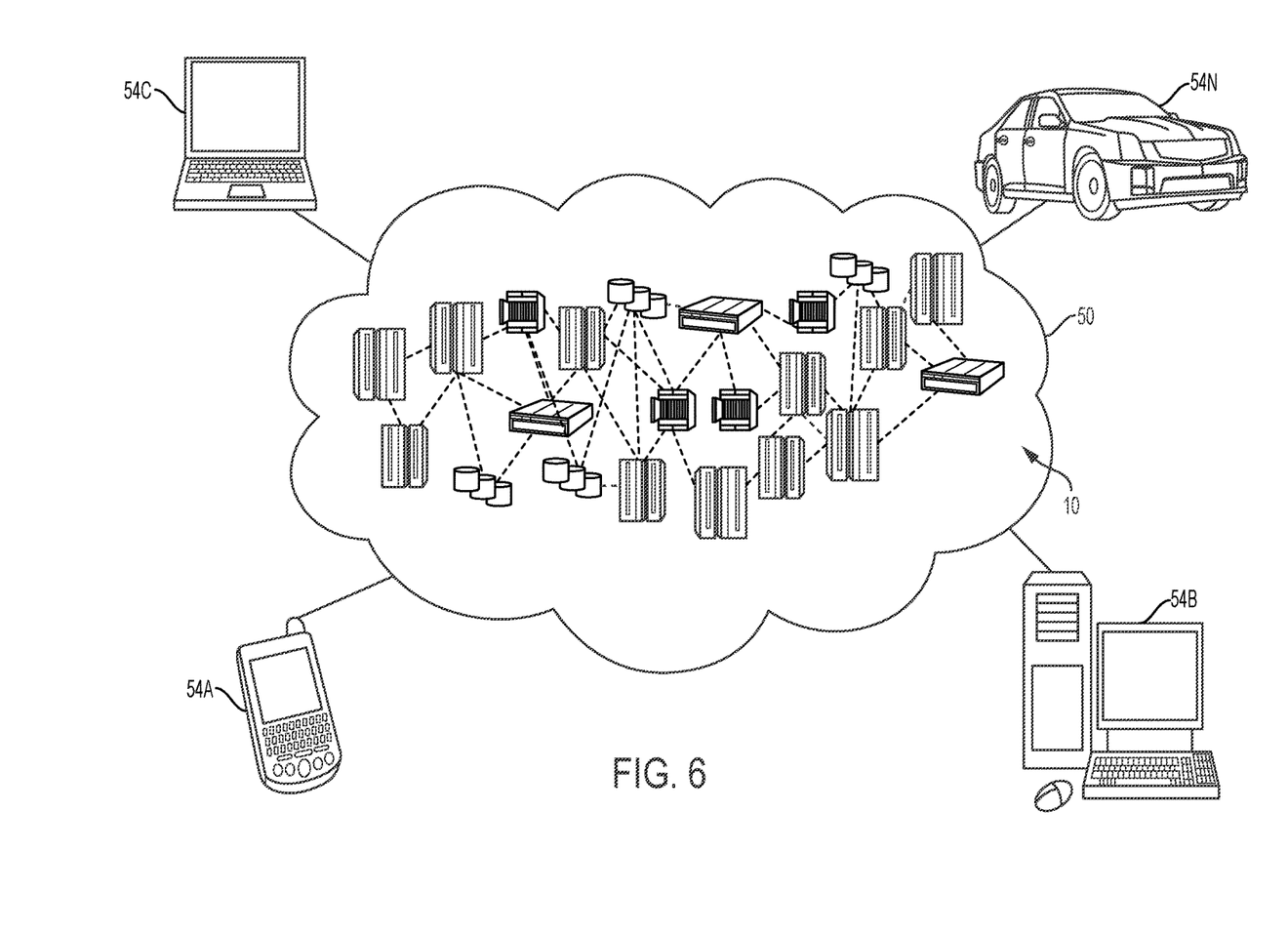
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
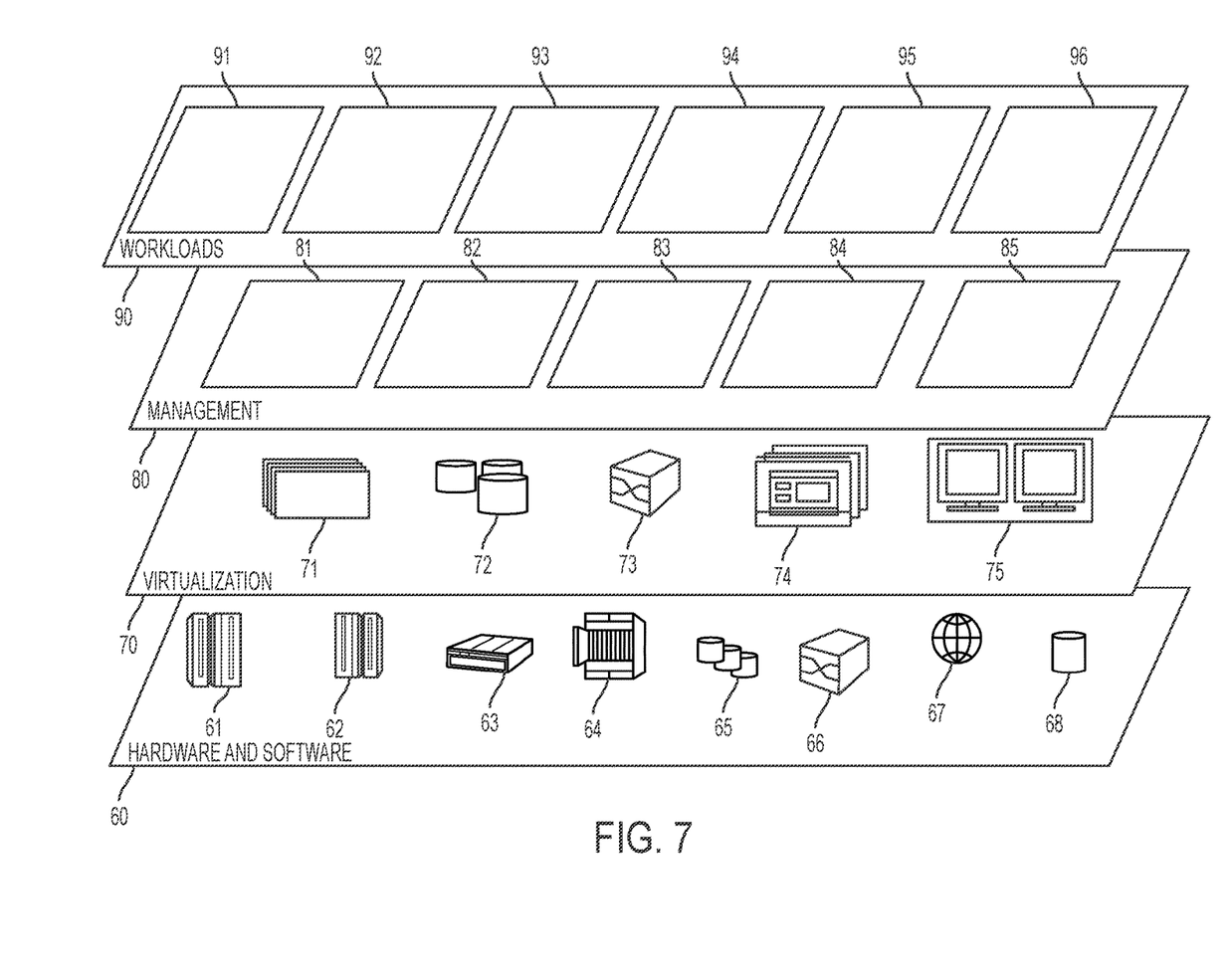
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. Tare intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving a real time search for digital information resulting in generation of modified search based software code for configuring a database structure, 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network search query improvement method comprising:
executing, by a processor of a hardware device, a real time search with respect to a specialized database associated with an Internet based search for specified digital information;
automatically identifying, by said processor, digital attributes of associated digital data identified during said real time search, wherein said automatically identifying said digital attributes comprises:
replacing associated portions of said digital data with digital tokens representing said associated portions; and
associating said digital tokens with said digital attributes;
ranking, by said processor, specified keywords associated with said digital attributes;
executing, by said processor, multi-variant analysis code with respect to input logs associated with said real time search;
generating, by said processor based on results of said executing said multi-variant analysis code, search condition arrays associated with said concept;
generating, by said processor based on said search condition arrays and results of said ranking, search based software code associated with said Internet search for said specified digital information;
recording, by said processor, real time user interactions with said search based software code;
analyzing, by said processor, said input logs;
locating, by said processor based on results of said analyzing, a group of digital attributes of said digital attributes missing from said search based software code;
modifying, by said processor based on said real time user interactions, said search based software code resulting in generation of modified search based software code, wherein said modifying comprises adding said group of digital attributes to said search based software code;
executing, by said processor in response to a user command, said modified search with respect to said digital attributes based on said modified search based software code;
presenting, by said processor via a specialized graphical user interface, relevant results associated with said Internet based search for said specified digital information;
configuring, by said processor based on said relevant results, said database such that said modified search is stored within a logical partition of said database, wherein said logical partition is enabled to execute multiple real time Internet searches for said specified digital information;
configuring, by said processor, said specialized database such that said digital tokens are stored within an additional logical partition of said specialized database; and
combining, by said processor, said digital tokens with said search based software code.

2. The method of claim 1, further comprising:
automatically connecting, by said processor via switching circuitry, said database to additional hardware devices for executing said multiple real time Internet searches for said specified digital information.

3. The method of claim 1, wherein said modified search based software code comprises natural language processing software code.

4. The method of claim 1, further comprising:
automatically diagnosing, by said processor, technical issues with said modified search based software code; and
automatically repairing, by said processor, said technical issues with said modified search based software code.

5. The method of claim 1, further comprising:
providing at least one support service for at least one of creating, integrating, hosting, maintaining, and deploying computer-readable code in the control hardware, said code being executed by the computer processor to implement: said executing said real time search, said automatically identifying, said ranking, said generating, said recording, said modifying, said executing said modified search, said presenting, and said configuring.

6. A computer program product, comprising a computer readable hardware storage medium storing a computer readable program code, said computer readable program code comprising an algorithm that when executed by a processor of a hardware device implements a network search query improvement method, said method comprising:
executing, by said processor, a real time search with respect to a specialized database associated with an Internet based search for specified digital information;
automatically identifying, by said processor, digital attributes of associated digital data identified during said real time search, wherein said automatically identifying said digital attributes comprises:
replacing associated portions of said digital data with digital tokens representing said associated portions; and
associating said digital tokens with said digital attributes;
ranking, by said processor, specified keywords associated with said digital attributes;
executing, by said processor, multi-variant analysis code with respect to input logs associated with said real time search;
generating, by said processor based on results of said executing said multi-variant analysis code, search condition arrays associated with said concept;
generating, by said processor based on said search condition arrays and results of said ranking, search based software code associated with said Internet search for said specified digital information;
recording, by said processor, real time user interactions with said search based software code;
analyzing, by said processor, said input logs;
locating, by said processor based on results of said analyzing, a group of digital attributes of said digital attributes missing from said search based software code;
modifying, by said processor based on said real time user interactions, said search based software code resulting in generation of modified search based software code, wherein said modifying comprises adding said group of digital attributes to said search based software code;
executing, by said processor in response to a user command, said modified search with respect to said digital attributes based on said modified search based software code;
presenting, by said processor via a specialized graphical user interface, relevant results associated with said Internet based search for said specified digital information;
configuring, by said processor based on said relevant results, said database such that said modified search is stored within a logical partition of said database, wherein said logical partition is enabled to execute multiple real time Internet searches for said specified digital information;
configuring, by said processor, said specialized database such that said digital tokens are stored within an additional logical partition of said specialized database; and
combining, by said processor, said digital tokens with said search based software code.

7. The computer program product of claim 6, wherein said method further comprises:
automatically connecting, by said processor via switching circuitry, said database to additional hardware devices for executing said multiple real time Internet searches for said specified digital information.

8. The computer program product of claim 6, wherein said modified search based software code comprises natural language processing software code.

9. The computer program product of claim 6, wherein said method further comprises:
automatically diagnosing, by said processor, technical issues with said modified search based software code; and
automatically repairing, by said processor, said technical issues with said modified search based software code.

10. A hardware device comprising a processor coupled to a computer-readable memory unit, said memory unit comprising instructions that when executed by the computer processor implements a network search query improvement method comprising:
executing, by said processor, a real time search with respect to a specialized database associated with an Internet based search for specified digital information;
automatically identifying, by said processor, digital attributes of associated digital data identified during said real time search, wherein said automatically identifying said digital attributes comprises:
replacing associated portions of said digital data with digital tokens representing said associated portions; and
associating said digital tokens with said digital attributes;
ranking, by said processor, specified keywords associated with said digital attributes;
executing, by said processor, multi-variant analysis code with respect to input logs associated with said real time search;
generating, by said processor based on results of said executing said multi-variant analysis code, search condition arrays associated with said concept;
generating, by said processor based on said search condition arrays and results of said ranking, search based software code associated with said Internet search for said specified digital information;
recording, by said processor, real time user interactions with said search based software code;

analyzing, by said processor, said input logs;

locating, by said processor based on results of said analyzing, a group of digital attributes of said digital attributes missing from said search based software code;

modifying, by said processor based on said real time user interactions, said search based software code resulting in generation of modified search based software code, wherein said modifying comprises adding said group of digital attributes to said search based software code;

executing, by said processor in response to a user command, said modified search with respect to said digital attributes based on said modified search based software code;

presenting, by said processor via a specialized graphical user interface, relevant results associated with said Internet based search for said specified digital information;

configuring, by said processor based on said relevant results, said database such that said modified search is stored within a logical partition of said database, wherein said logical partition is enabled to execute multiple real time Internet searches for said specified digital information;

configuring, by said processor, said specialized database such that said digital tokens are stored within an additional logical partition of said specialized database; and combining, by said processor, said digital tokens with said search based software code.

11. The hardware device of claim 10, wherein said method further comprises:

automatically connecting, by said processor via switching circuitry, said database to additional hardware devices for executing said multiple real time Internet searches for said specified digital information.

* * * * *